United States Patent [19]

Hess

[11] Patent Number: 5,695,282

[45] Date of Patent: Dec. 9, 1997

[54] MIXING PITCHER

[75] Inventor: Kevin Hess, Mt. Prospect, Ill.

[73] Assignee: The Pampered Chef, Ltd., Addison, Ill.

[21] Appl. No.: 606,538

[22] Filed: Feb. 23, 1996

[51] Int. Cl.[6] .................................................. B01F 11/00
[52] U.S. Cl. ..................................... 366/256; 366/332
[58] Field of Search ........................... 366/130, 255-260, 366/332-335

[56] References Cited

U.S. PATENT DOCUMENTS

| | | | |
|---|---|---|---|
| 722,833 | 3/1903 | Furlong | 366/256 |
| 1,174,828 | 3/1916 | Copeland | 366/256 |
| 2,266,186 | 12/1941 | Fischer | 366/256 X |
| 2,291,708 | 8/1942 | Gluck | 366/260 |
| 2,726,071 | 12/1955 | Bernhardt | 366/256 |
| 3,137,228 | 6/1964 | Elow | 366/332 X |
| 4,010,934 | 3/1977 | McCord et al. | 366/130 X |
| 5,284,389 | 2/1994 | Lumsden | 366/256 |
| 5,533,802 | 7/1996 | Garganese | 366/256 |
| 5,580,169 | 12/1996 | Ghidini | 366/256 |

*Primary Examiner*—Charles E. Cooley
*Attorney, Agent, or Firm*—Olson & Hierl, Ltd.

[57] ABSTRACT

A combination mixing pitcher having a mixer subassembly that incorporates an impeller which is reciprocally longitudinally slidably movable but not rotatable within the pitcher. The impeller is fixed to one end of a plunger rod that reciprocates slidably through a matingly engagable axial channel in a lid that peripherally closes the pitcher mouth. The impeller employs a plurality of flat, radially pitched, fan shaped blades that are in radially equally spaced relationship to each other and that extend between a central hub and a peripheral polygonally configured rim. The mixer subassembly maximizes mixing of a liquid in the pitcher with a minimum of time and energy and with no spillage.

7 Claims, 2 Drawing Sheets

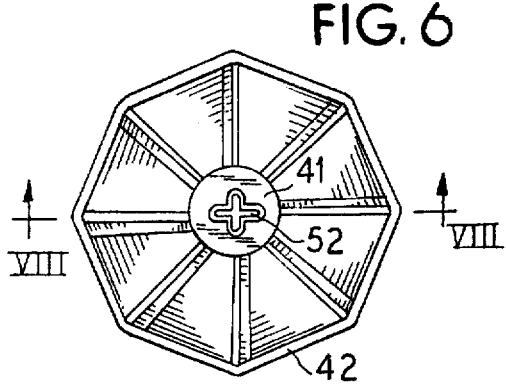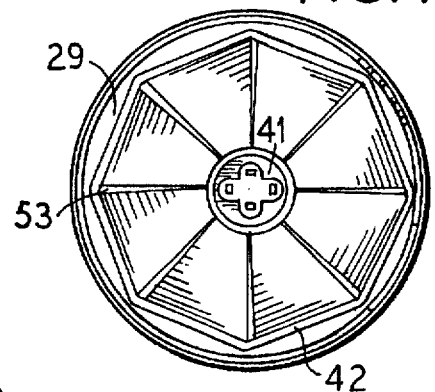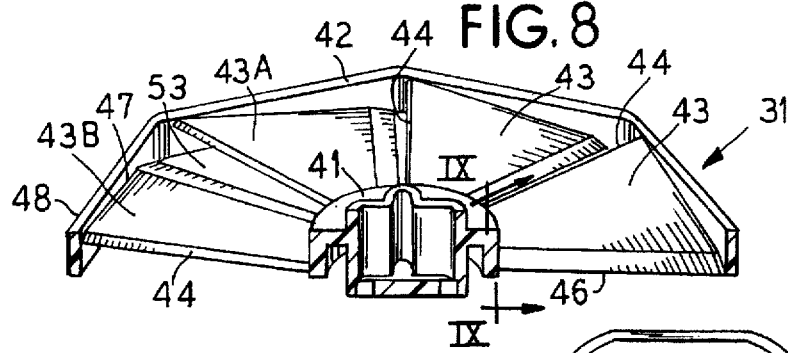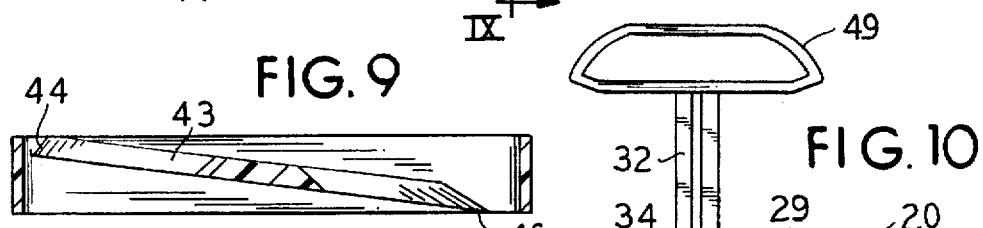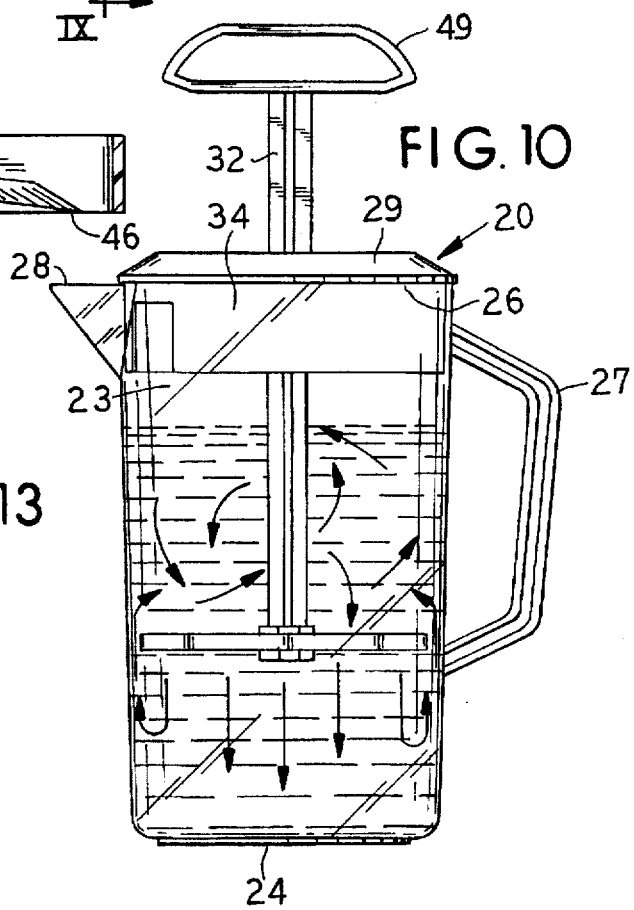

MIXING PITCHER

FIELD OF THE INVENTION

This invention relates to pitchers equipped with a manually operated mixing apparatus.

BACKGROUND OF THE INVENTION

Certain types of beverage pitchers having manually operated means for mixing together fluid contents are well known.

Typically, the manually operated mixing means of the prior art was either inefficient or required substantial effort on the part of a user to achieve maximum mixing with a minimum of time and effort. This inefficiency was demonstrated by the fact that mixing at best took some time to accomplish and by the fact that use of the apparatus often involved spillage during the mixing operation or when the mixed liquid was subsequently poured from the pitcher.

There is a need for a new and improved combination of pitcher and mixer apparatus which overcomes such disadvantages.

SUMMARY OF THE INVENTION

This invention relates to a new and improved combination of beverage pitcher and coacting manually operated mixing apparatus.

The combination enables one to accomplish a mixing of the liquid contents of a pitcher in a minimum of time and with a minimum of effort but with maximum effectiveness.

The combination can be used with no spillage during use of the mixing apparatus or when the beverage is dispensed after completion of a mixing operation.

The combination is easily assembled, used and disassembled. The components of the combination are readily and conventionally made from various materials, as the fabricator or user may desire. However, it is presently preferred to construct all components of molded plastic. The combination can be easily and thoroughly cleaned and is durable.

The pitcher of the combination is preferably annular in transverse cross-section and preferably slightly increases in diameter from the bottom to the top of the pitcher.

The mixing subassembly of the combination incorporates a radially deflecting pitched blade non-rotating impeller that is in fixed association with an oscillatorily movable, non-rotating plunger rod. The plunger rod is cross-sectionally preferably plus (+) configured and slidably moves axially through a central mating channel in a stationary cover which circumferentially and loosely friction fits about the pitcher rim. Other configurations of the plunger rod can be used provided the rod is effectively keyed to the cover for reciprocal sliding movement. Handle means is associated with the exposed and protruding upper end of the plunger rod for operator usage.

The impeller structure includes a plurality of pitched blades which are in radially spaced but adjacent relationship to one another and which have straight edges at their respective circumferentially outer ends.

Other and further objects, aims, purposes, features, advantages, embodiments, applications and the like will be apparent to those skilled in the art from the present specification disclosures taken with the accompanying drawings and the appended claims.

BRIEF DESCRIPTION OF THE DRAWINGS

In the drawings:

FIG. 6 is a plan view of the impeller top side taken along the line VI—VI of FIG. 3, but with the plunger rod removed;

FIG. 7 is a plan view showing the undersides of the cover and impeller of the mixer subassembly with the impeller raised and nestably received therein;

FIG. 8 is a diametrically taken vertical sectional view through the impeller of the mixer subassembly, but with the viewable impeller blades, rim and hub components being shown isometrically for structural disclosure purposes;

FIG. 9 is an enlarged, vertical, sectional view taken along the line IX—IX of FIG. 8 showing an individual pitched blade and adjoining rim side portion;

FIG. 10 is a side elevational view of the mixing pitcher of FIG. 1 illustrating diagrammatically liquid movement in the pitcher when the mixer subassembly is operated;

FIG. 11 is a transverse sectional view through a mid-region of the plunger rod of the mixer subassembly; and FIGS. 12, 13 and 14 are each similar to FIG. 11 but each showing a transverse sectional view of a different alternative embodiment of a plunger rod for a mixer subassembly.

DETAILED DESCRIPTION

Figure 1:
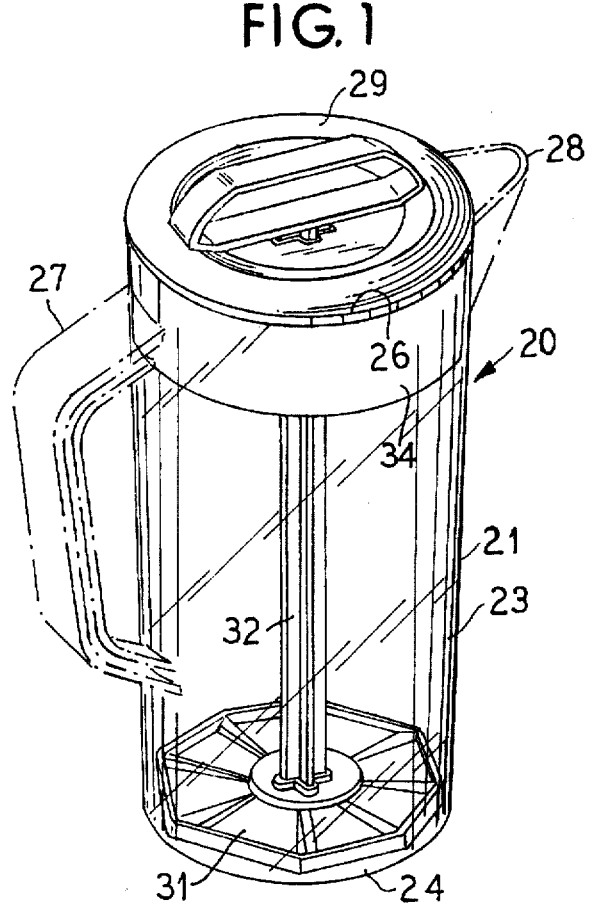
FIG. 1 is a perspective view of one embodiment of mixing pitcher of this invention, the spout and the handle being shown in phantom.
Figure 2:
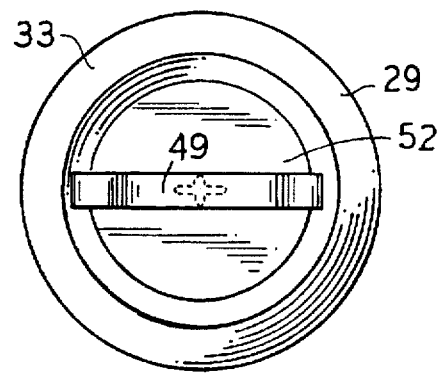
FIG. 2 is a top plan view of the mixing pitcher of FIG. 1.

Referring to the drawings, one embodiment 20 of the mixing pitcher of this invention is shown. The combination 20 employs a pitcher 21 and a mixer subassembly 22 that can be disassociated from the pitcher 21.

The pitcher 21 has various configurations. Preferably, pitcher 21 is generally circular in transverse cross section, generally has longitudinally uniform side walls 23, a circular bottom wall 24, an upper, upwardly opening terminal, generally circular mouth 26, a handle 27 associated with portions of the sidewalls 23, and a spout 28. Preferably, the spout 28 is formed as a sidewall protrusion at and adjacent to the mouth 26. While the side walls 23 can be cylindrical, it is presently preferred to have the side walls 23 diverge slightly conically proceeding upwardly from bottom wall 24 to mouth 26. A present preference is to have the inside diameter of pitcher 21 adjacent bottom wall 24 be not more than about 3–5% less than the inside diameter of pitcher 21 adjacent mouth 26 (not considering spout 28).

While the pitcher 21 can be comprised of various materials, it is presently preferred to form the pitcher of a molded plastic, such as a transparent acrylic resin, or the like.

The mixer subassembly 22 comprises a lid 29, an impeller 31 and a handle-equipped plunger rod 32.

The lid 29 can have various configurations, but characteristically is adapted to cover the mouth 21 sealingly while preferably permitting liquid in pitcher 21 to be dispensed from the spout 28 by tilting the pitcher 21 while holding the handle 27 by one hand (not detailed). In the combination 20, the lid 29 preferably comprises a mouth closing cover 33 that is combination with an integrally formed broad lid (or cover) flange 34 that extends circumferentially adjacent the brim of cover 33 and is downturned. The flange 34 is receivable through the mouth 26. The circumferential outside terminal wall portions of flange 34 are adapted to make contacting and sealing engagement with radially adjacent circumferential inside wall portions of the pitcher 21 that are longitudinally adjacent to the mouth 26 except in the region of the spout 28.

The lid 29 can be comprised of various materials. However, it is presently preferred to mold the lid 29 as a single or unitary structure. Various plastics are suitable, such as a polyolefin resin, a polyacrylic resin, or the like, preferably a resin which is slightly resilient, slightly elastomeric, and slightly waxy as regards to surface characteristics, thereby to enhance desirable use characteristics for the lid 29, as those skilled in the art will appreciate.

Figure 4:
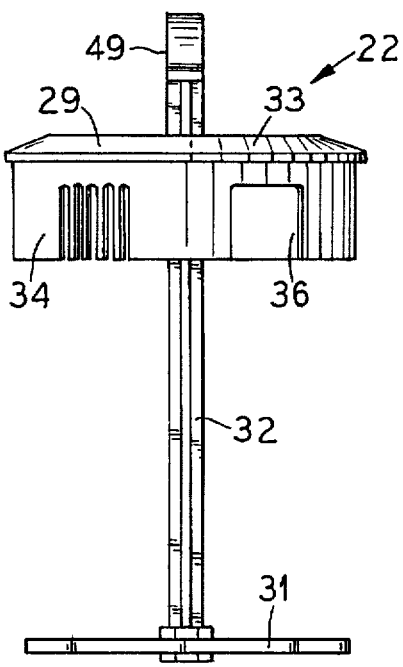
FIG. 4 is a side elevational view similar to FIG. 3 but showing the adjacent side (rotated 90° relative to FIG. 3) of the mixer subassembly.

The cover flange 34 preferably is sized so as to close the spout 28 when the lid 29 fully engaged with pitcher 21 and seated across the mouth 26. However, the cover flange 34 optionally but preferably has defined therein a first discontinuity or aperture 36 (see FIG. 4) which is generally positionable radially adjacent to the spout 28 by suitable orientation of the lid 29 when the lid 29 is being associated with the pitcher 21 over the mouth 26 thereof. Thus, after the lid 29 is associated with the pitcher 21, liquid in the pitcher 21 can be dispensed from the assembled combination 20 through the spout 28 and the aperture 36.

Optionally but preferably, the cover flange 34 also has defined therein in circumferentially spaced relationship relative to the aperture 36 a second discontinuity or aperture 37. Like aperture 36, aperture 37 is generally positionable radially adjacent to the spout 28 by suitable orientation of the lid 29 when the lid 29 is being associated with the pitcher 21 over the mouth 26 thereof. However, the aperture 37 is provided with an integrally formed lattice structure which can have various configurations. In the embodiment shown, the lattice structure is provided by a plurality of longitudinally extending tines 38 which depend from, and are integrally formed with, the upper edge portion of the flange 34 in the region of the aperture 37. The tines 38 function when aperture 37 is aligned with the spout 28 in the assembled combination 20 to retain solids in the pitcher 21 when liquid is being dispensed through spout 28. Examples of solids include frozen bodies (such as ice cubes, or frozen, not yet melted, juice or fruit), or fruit parts (such as lemon or lime rinds).

The mixing impeller 31 (see FIGS. 6 and 7) preferably incorporates a hub 41 and a preferably regular polygonally sided (i.e., preferably equal generally straight interconnected sections) rim 42 whose maximum outside diameter is less than the minimum inside diameter of the pitcher 21. An impeller 31 can be variously configured about its perimeter so as to adapt the impeller to coact with variously configured pitchers.

A plurality of individually generally flat, radially pitched, fan-shaped blades 43 are positioned between the hub 41 and the rim 42. The blades 43 are preferably in radially equally spaced but circumferentially adjacent relationship to each other. Thus, preferably, and for example, in one circumferential direction (proceeding either clockwise, or counter-clockwise as shown in the present embodiment 20), each blade 43 has a trailing upper radial edge 44 and a leading lower radial edge 46 so that the trailing upper radial edge 44 of each blade 43A is circumferentially adjacent to, but is vertically displaced from, the leading lower radial edge 46 of the next adjacent blade 43B (see FIG. 8). If desired, the blade pitch and the position of the trailing and leading edges on a blade can be reversed. Preferably all blades have the same pitch. A slot 53 is provided between circumferentially adjacent blades, such as blades 43A and 43B. The blades 43 and slots 53 are preferably comparable to a sector of a circle in plan view.

Various relationships between blade outside ends and the polygonally configured rim can be employed. Preferably, the circumferentially outer edge portion 47 of each blade 43 is generally straight and is associated with the inside face of a single side 48 of the regular polygonally sided rim 42. Thus, the total number of individual rim sides 48 of a rim 42 is preferably equal to the total number of the blades 43 in a given impeller 31. Preferably, the leading radial edge 46 of each blade 43 is beveled. For example, the edge adjacent portion of each blade 43 that is circumferentially adjacent to the leading lower radial edge 46 thereof is downwardly beveled, thereby to enhance at such edge 46 the blade 43 pitch and to provide a bladed edge that enhances mixing. Optionally but preferably (and as shown), the trailing radial edge 44 of each blade 43 is also beveled in a direction contrary to that of the bevel associated with edge 46, thereby to encourage the runoff of liquid from edge 44 while encouraging the run-in of liquid at edge 46 during mixer subassembly 22 operation in a mode where liquid enters and passes through impeller 31 at each slot 53.

The plunger rod 32 preferably has a cross-sectionally generally plus-type of configuration (see, for example, FIG. 11). One end of the plunger rod 32 is fixed axially and perpendicularly to the hub 41. Conveniently, and preferably (as shown), the one rod end is received perpendicularly in a socket 52 defined in the hub 41. The opposite end of the plunger rod 32 (which is on the exposed outer side of the cover 33) is fixed to a handle 49.

Figure 5:
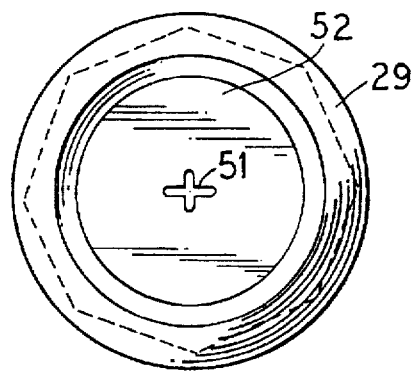
FIG. 5 is a transverse view across the mixing pitcher cover taken along the line V—V of FIG. 3, but with the plunger rod removed.
Figure 3:
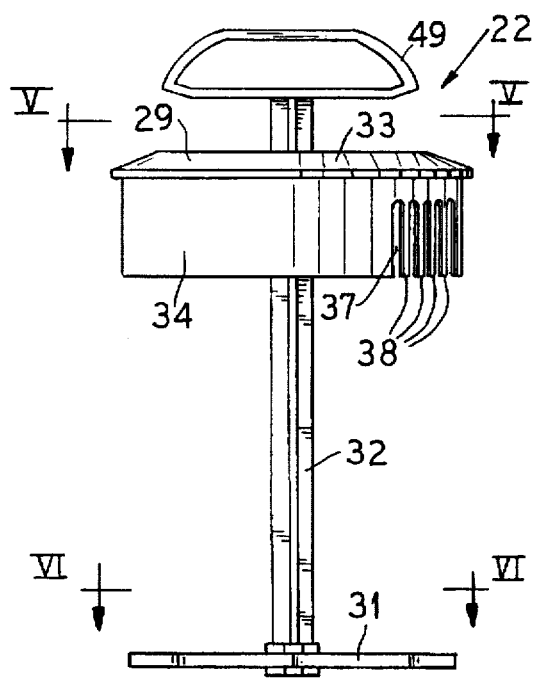
FIG. 3 is a side elevational view of the mixer subassembly employed in the mixing pitcher of FIG. 1.

The cover 33 has an axially located channel 51 defined therethrough (see FIG. 5). The plunger rod 32 extends through, and is reciprocally slidably movable in, the channel 51. The channel 51 is configured to conform to the exterior perimeter configuration of the plunger rod 32. Thus, the interrelationship between the channel 51 and the plunger rod 32 is such that the plunger rod 32 is non-rotatable relative to the lid 29. Consequently, when the lid 29 is sealingly engaged with the mouth 26, the impeller 31 is reciprocally movable longitudinally inside the pitcher 21 by raising and lowering the handle 49, but the plunger rod 32 and the impeller 31 are not rotatable.

Preferably, in the plunger rod 32, the width thereof in one transverse direction is greater than the width thereof in a second transverse direction which extends perpendicularly to the one transverse direction. Such a width differential is desirable for purposes of achieving strength and a long wear life in the channel 51, as those skilled in the art will appreciate.

In general, the relationship between a channel such as channel 51 and a plunger rod such as rod 32 is such that this rod 32 moves reciprocally relative to such channel 51 but does not rotate relative to such channel. Thus, a plunger rod 32 can have various cross sectional configurations (other than round) and a mating channel can have a matching, slightly larger configuration sufficient to accommodate such a rod. Suitable alternative configurations for a rod and a channel are exemplified by the FIGS. 12, 13 and 14, as those skilled in the art will readily appreciate.

Preferably, in the impeller 31, the blades are equally sized and spaced relative to each other and number of blades 43 ranges from 6 through 10. The pitch angle of each blade is preferably the same and ranges from about 5 to about 15 degrees. More preferably, and as shown, the number of blades 43 is 8 and the pitch angle of each blade is about 5 to about 10 degrees. However, other blade numbers and blade pitch angles can be employed if desired.

Preferably, the handle 49 is integrally formed with rod 32 at the upper end of the plunger rod 32. Also, preferably, but optionally, the handle 49 has a bottom configuration that is cooperatively receivable in a central depression 52 defined in the cover 33 when the impeller 32 is positioned at the lower end of the plunger rod 32 adjacent the bottom wall 24 inside surface of said pitcher.

Preferably, the mixing impeller 31 is unitarily formed as a single or unitary structure. Preferably, the plunger rod 32 and the impeller 22 are each separately formed of a molded plastic, such as a plastic similar to that used for forming the lid 29. Preferably, after fabrication, the lower end of the plunger rod 32, with its preferably integrally formed handle 49 at its upper end, is extended through the channel 51 before being seated in the socket 52 that is axially integrally formed in the impeller 31. The impeller 31 and the lower end of rod 32 can then be conventionally fastened together by heat sealing, ultrasonic welding, applied adhesive or the like.

Superior liquid mixing action is achieved in the assembled combination 20. When the lowered plunger rod 32 is raised vertically by the handle 49, liquid in the pitcher 21 is urged to pass through the impeller 31 at the radial slot spacings 53 between adjacent blades 43. A spiral swirling current tends to develop. Concurrently, liquid is also urged to pass peripherally along the outside of the rim 42 adjacent to the sidewalls 23 of pitcher 21 and vertical currents tend to develop. The vertical and the spiral liquid currents so produced enhance mixing action. When the raised plunger arm 32 is lowered vertically by the handle 49, reverse liquid flows and liquid currents result. Turbulent mixing action appears to be achieved when the impeller moves either upwards or downwards. Because rotation of the impeller 31 is restrained, mixing action is also enhanced.

It will be readily apparent from the foregoing detailed description of the invention and from the accompanying illustrations thereof that numerous variations and modifications may be effected without departing from the true spirit and scope of the novel concepts or principles of this invention.

What is claimed is:

1. A mixing pitcher comprising:
   (A) a cross-sectionally generally circular pitcher having longitudinally uniform sidewalls, a closed bottom, an upwardly opening mouth opposed to said bottom, spout means adjacent said mouth, and pitcher handle means;
   (B) a mixer subassembly that is disassociatively associatable with said pitcher, said mixer subassembly comprising in combination:
      (1) lid means sealingly engagable with said mouth, said lid means comprising a mouth cover portion and a circumferentially extending, downturned, integrally formed lid flange portion which is receivable through said mouth and whose circumferential outside terminal wall portions are adapted to make sealing engagement with radially adjacent circumferential inside wall portions of said pitcher that are longitudinally adjacent to said mouth except in the region of said spout means;
      (2) a liquid-deflecting impeller comprising:
         (a) a hub,
         (b) a polygonally sided rim whose maximum outside diameter is less than the minimum inside diameter of said pitcher,
         (c) a plurality of individually generally flat, radially pitched, fan-shaped blades, each blade having opposed, spaced, parallel top and bottom side faces and circumferentially spaced, generally radially extending side edges, each said blade having a constant pitch across surfaces of said side faces, and each blade being positioned between said hub and said rim, said blades being in radially equally spaced but non-overlapping adjacent relationship to each other along said radially extending side edges of respective adjacent blades whereby, in one circumferential direction, each said blade has a circumferentially extending outer edge portion, a trailing upper radial side edge and a leading lower radial side edge so that said trailing upper radial edge of each said blade is circumferentially adjacent to, but vertically displaced from, said leading lower radial edge of the next adjacent said blade,
         (d) said circumferentially extending outer edge portion of each said blade being integrally associated with a single side of said polygonally sided rim so that the number of said rim sides is equal to the number of said blades, and
         (e) portions of each said blade adjacent to said leading lower radial side edge thereof being beveled;
      (3) a plunger rod having cross-sectionally a generally plus-type configuration, one end of said rod being fixed axially to said hub, and the opposite end of said rod having rod handle means; and
      (4) said lid means further having an axially located channel defined through said mouth cover portion through which said plunger rod is reciprocally slidably movable, the interrelationship between said channel and said plunger rod being such that said plunger rod is non-rotatable and reciprocally movably longitudinally relative to said lid means;
   (C) said lid flange having defined therein a first discontinuity which is generally positionable radially adjacent to said spout means so that, when said lid means is associated with said pitcher over said mouth, liquid being dispensed from said mixing pitcher through said spout means flows through said first discontinuity;
   (D) said plunger rod and said rod handle means are integrally formed and said rod handle means has a bottom configuration that is cooperatively receivable in, and engagable with, a central depression defined in said mouth cover portion when said impeller is adjacent said bottom; whereby, when said lid means is sealingly engaged with said mouth, said impeller is reciprocally movable longitudinally in said pitcher by said rod handle means.

2. The mixing pitcher of claim 1 wherein, in said impeller, the number of said blades ranges from 6 through 10, and the pitch angle of each blade ranges from about 5 to about 15 degrees.

3. The mixing pitcher of claim 2 wherein the number of said blades is 8 and the pitch angle of each blade is about 5 to about 10 degrees.

4. The mixing pitcher of claim 1 wherein, in said plunger rod, the width thereof in one transverse direction is greater than the width thereof in a second transverse direction which extends perpendicularly to said one transverse direction.

5. The mixing pitcher of claim 1 wherein, in said pitcher, the inside diameter thereof adjacent said bottom is not more than about 3–5% less than the inside diameter thereof adjacent said mouth thereof and said spout means is adjacent said mouth.

6. The mixing pitcher of claim 1 wherein said lid flange has defined therein in circumferentially spaced relationship relative to said first discontinuity a second discontinuity which is generally positionable radially adjacent to said spout means when said lid means is associated with said pitcher over said mouth thereof, said second discontinuity having a lattice structure integrally formed therewith, whereby liquid being dispensed from said mixing pitcher through said spout means flows through said second discontinuity while solids are retained in said pitcher by said lattice structure.

7. A mixing pitcher comprising:

(A) a cross-sectionally generally circular pitcher having a closed bottom, an upwardly opening mouth opposed to said bottom, and spout means adjacent said mouth, and (B) a mixer subassembly comprising:

(1) lid means sealingly engagable with said mouth, said lid means having a mouth cover portion and a circumferentially extending, downturned, integrally formed lid flange portion which is receivable through said mouth and is adapted to make sealing engagement with radially adjacent circumferential portions of said pitcher that are longitudinally adjacent to said mouth except in the region of said spout means;

(2) a liquid-deflecting impeller having a hub portion and a rim portion and having a plurality of individually generally flat, radially pitched, fan-shaped blades, each blade having opposed, spaced, parallel top and bottom side faces, each said blade having a constant pitch across surfaces of said side faces, and each blade being positioned between said hub portion and said rim portion, said blades being in radially equally spaced but non-overlapping adjacent relationship relative to each other whereby, in one circumferential direction, each said blade has a circumferentially outer edge portion, a trailing upper radial edge and a leading lower radial edge so that said trailing upper radial edge of each said blade is circumferentially adjacent to, but vertically displaced from, said leading lower radial edge of the next adjacent said blade, and having portions of each said blade adjacent to said leading lower radial edge thereof beveled; and (3) a plunger rod having cross-sectionally a generally plus-type configuration, one end of said rod being centrally and axially fixed to said hub portion, and the opposite end of said rod being fixed to a rod handle means; and (4) said lid means further having an axially located channel defined in said mouth cover portion through which said plunger rod is reciprocally slidably movable, the interrelationship between said lid means, said channel and said plunger rod being such that said plunger rod is non-rotatable and reciprocally movable longitudinally relative to said lid means;

(C) said lid flange having defined therein a first discontinuity which is generally positionable radially adjacent to said spout means so that, when said lid means is associated with said pitcher over said mouth, liquid being dispensed from said mixing pitcher through said spout means flows through said first discontinuity; and (D) said rod handle means is cooperatively receivable ink and engagable with, a central depression defined in said mouth cover portion when said impeller is adjacent said bottom; whereby, when said lid means is sealingly engaged with said mouth, said impeller is reciprocally movable longitudinally in said pitcher by said rod handle means.

* * * * *